July 23, 1963 S. E. HÄGGLUND 3,098,429
DIAPHRAGM FILTER PRESS
Filed Dec. 28, 1960 6 Sheets-Sheet 1

Inventor:
Sven Eric Hägglund

Inventor:
Sven Eric Hägglund

July 23, 1963 S. E. HÄGGLUND 3,098,429
DIAPHRAGM FILTER PRESS

Filed Dec. 28, 1960 6 Sheets-Sheet 4

Inventor:
Sven Eric Hägglund
By
Patent Agent

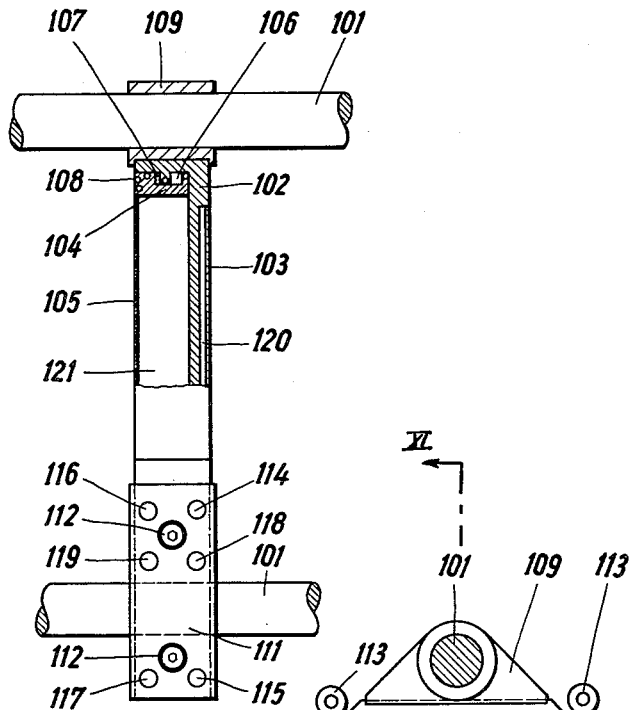
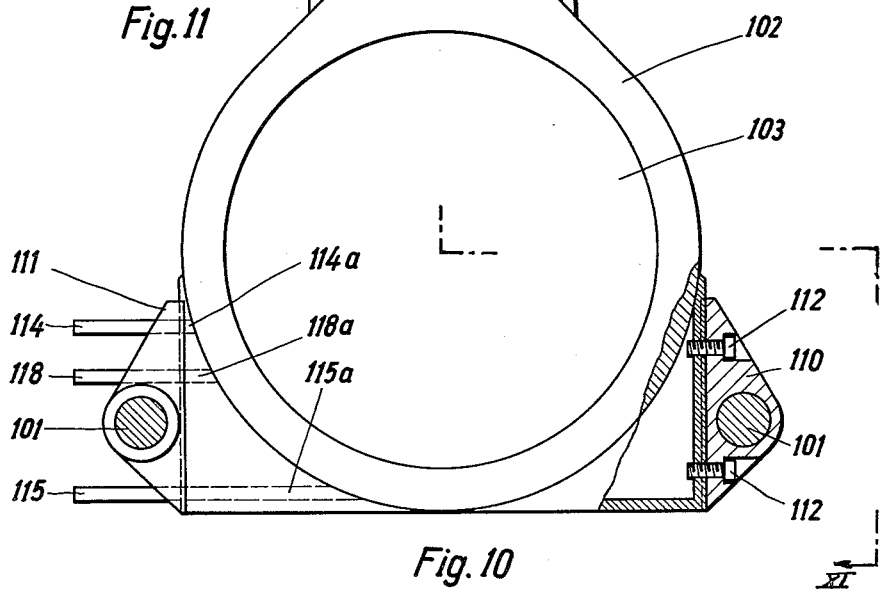

July 23, 1963
S. E. HÄGGLUND
3,098,429
DIAPHRAGM FILTER PRESS
Filed Dec. 28, 1960
6 Sheets-Sheet 6
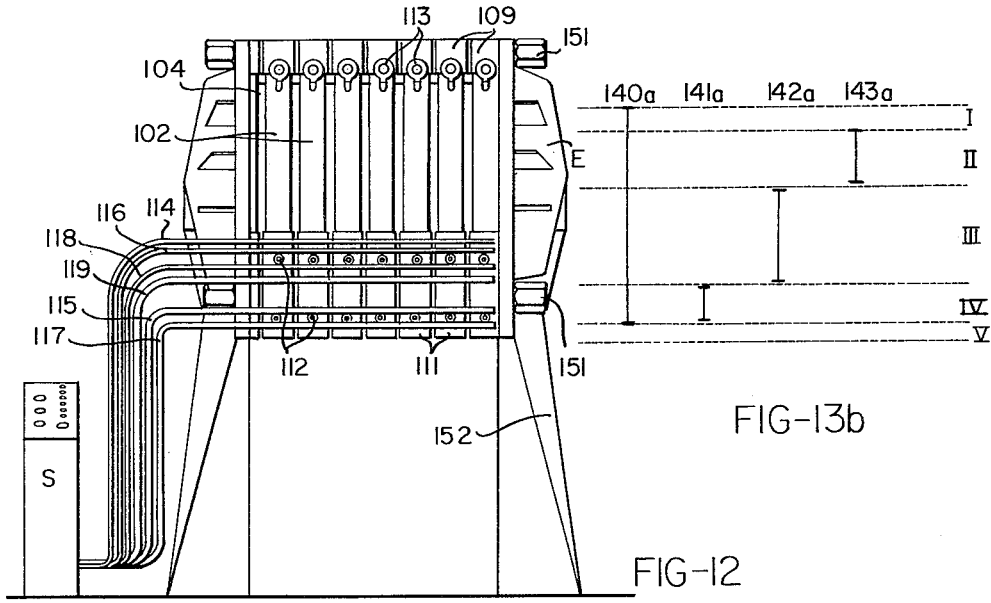
FIG-12
FIG-13b
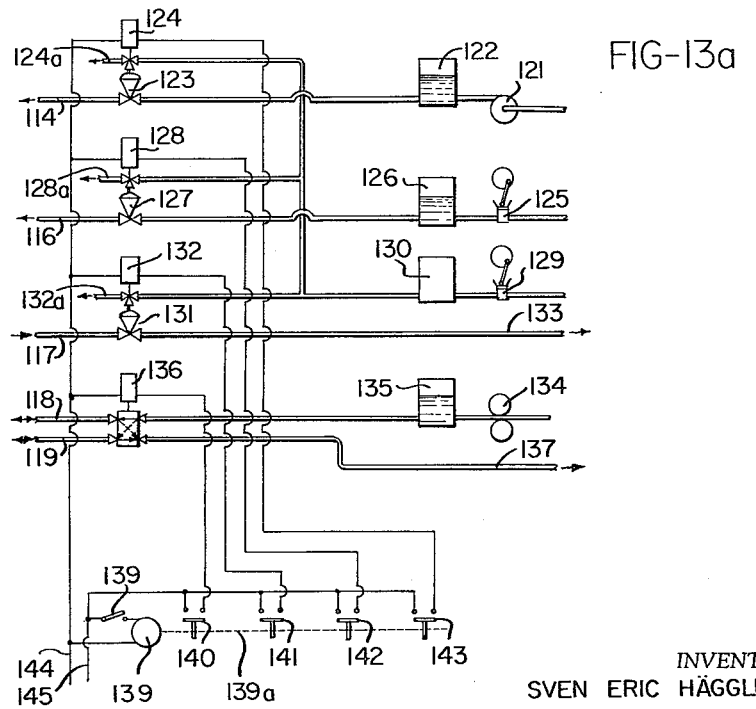
FIG-13a
INVENTOR.
SVEN ERIC HÄGGLUND
BY United States Patent Office 3,098,429
Patented July 23, 1963

3,098,429
DIAPHRAGM FILTER PRESS
Sven Erik Hägglund, Lund, Sweden, assignor to Borsig Aktiengesellschaft, Berlin-Tegel, Germany, and Aktiebolaget Svensk Torvforadling, Sosdala, Sweden
Filed Dec. 28, 1960, Ser. No. 78,885
Claims priority, application Germany Dec. 31, 1959
9 Claims. (Cl. 100—115)

The present invention relates to a filter press according to which the material to be pressed is de-watered by a diaphragm, subjected to a pressure medium and is then pressed into a certain shape.

Diaphragm filter presses are employed where a particularly high pressure is to be exerted in order to dewater the respective material to a maximum and to obtain a solid shape-retaining pressed cake. Piston presses are not suitable for this purpose in view of the required sealing elements for the pressing piston.

With heretofore known diaphragm filter presses, it is, however, not possible to remove the filter cake from the press without opening the latter or disassembling the press which, of course, requires considerable time and labor. These facts have economically limited the employment of such filter presses for de-watering material with a considerable water content as for instance peat suspensions.

It is therefore, an object of the present invention to provide a diaphragm filter press which will overcome the above mentioned drawbacks.

It is another object of this invention to provide a diaphragm filter press which, without requiring manual labor, will have a high output.

It is a further object of this invention to provide a filter press as set forth in the preceding paragraphs, in which the individual elements of the press may easily and quickly be exchanged in case of damage so that the downtime of the press will be limited to a minimum and the output of the press will be a maximum.

These and other objects and advantages of the invention will appear more clearly from the following specification in connection with the accompanying drawings, in which.

Figure 5:
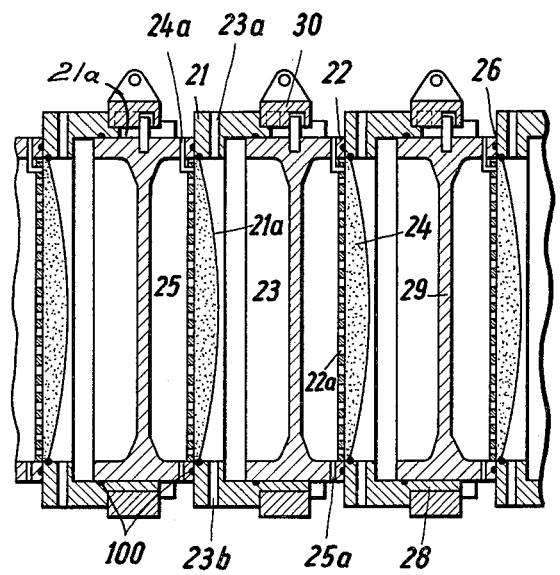
Figure 6:
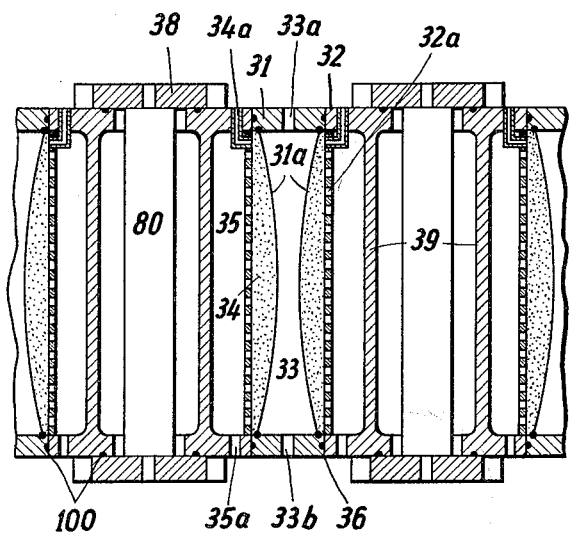

FIGS. 5 and 6 respectively diagrammatically illustrate a section through two further embodiments of the invention with the diaphragm support arranged stationarily.

Figure 7:
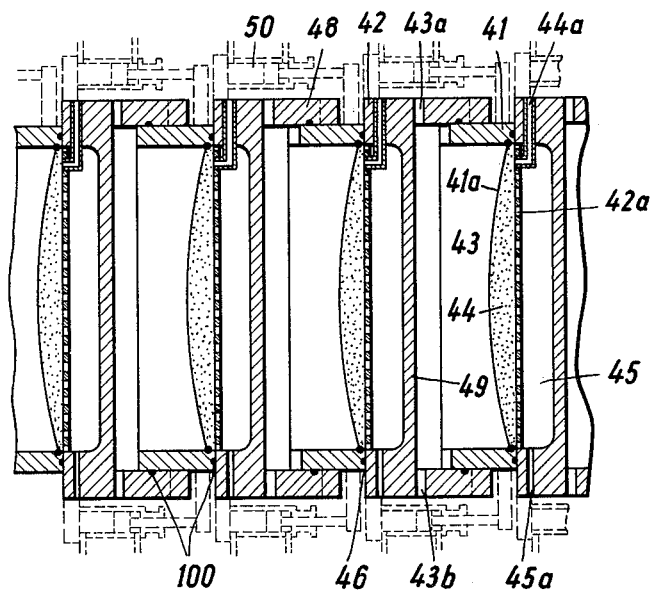
Figure 8:
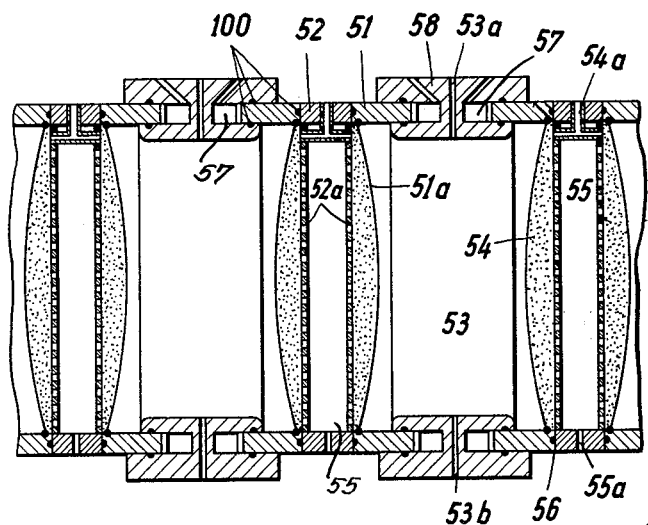
Figure 9:
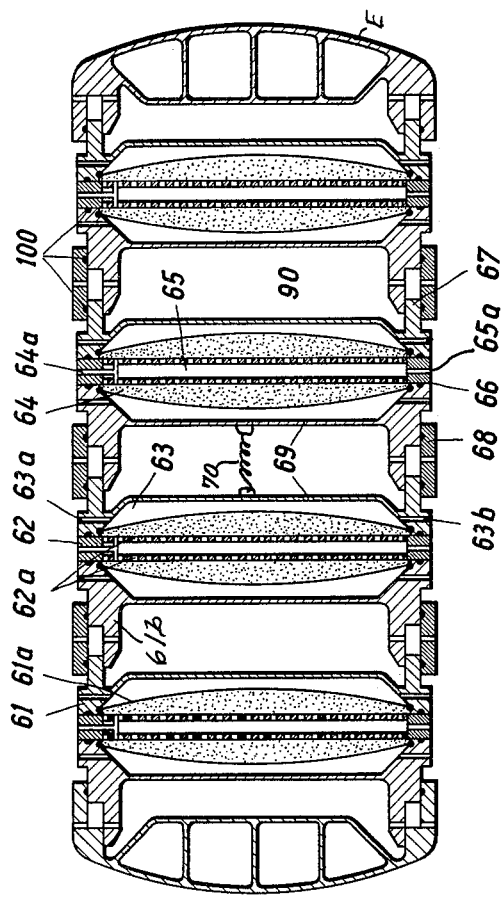

FIGS. 7 to 9 represent sections through further embodiments of the invention which differ from those of FIGS. 5 and 6 primarily in that the filter supports are arranged stationarily.

FIG. 10 illustrates on a somewhat larger scale than the preceding figures a view and partly a section of a press element seen in axial direction thereof with connecting parts pertaining thereto.

FIG. 11 is a section taken along the line XI—XI of FIG. 10.

FIG. 12 diagrammatically illustrates a side view of a diaphragm filter press composed of seven individual filter units.

FIGS. 13a and 13b illustrate control diagrams for use in connection with the present invention.

A filter press according to the present invention, in which the material to be pressed is de-watered and pressed into a certain shape by means of a filter arranged in a vertical plane and a diaphragm acted upon by a pressure medium, is characterized primarily in that between the support for the diaphragm, which support has a cylindrical cross section, and the support for the filter there is provided a gap for removing the filter cake. This gap has a width in excess of the thickness of the filter cake so that the filter cake can drop through said gap.

The said gap may be provided for instance by arranging the diaphragm support and the filter support at a fixed distance from each other and by bridging that gap for the removal of the filter cake by an annular piston which latter is arranged in the diaphragm support or in the filter support and is advanced and retracted by a pressure medium.

According to another solution in conformity with the present invention, the diaphragm support is stationary, and the filter support is, for purposes of opening and closing the filter, displaceably arranged in a stationary cylindrical guiding member so as to be axially movable relative to the diaphragm support. Inversely, it is also possible to arrange the filter support stationarily and to make the diaphragm support axially displaceable in a stationary cylindrical guiding member so as to be movable relative to the filter support.

According to a further development of the invention, a plurality of individual presses comprising primarily a filter support and a diaphragm support may be combined to a unit whereby the overall design will be considerably simplified and the production costs and costs of operation will be materially reduced.

Figure 1:
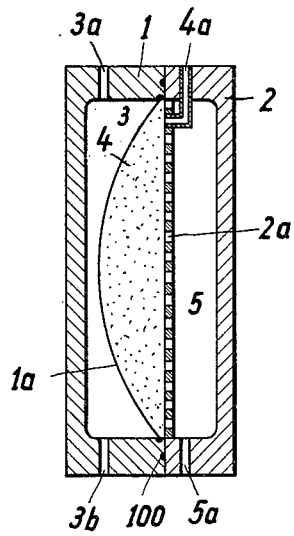
FIGS. 1 to 3 illustrate diagrammatically in section a basic embodiment of the invention in three different working positions respectively.
Figure 2:
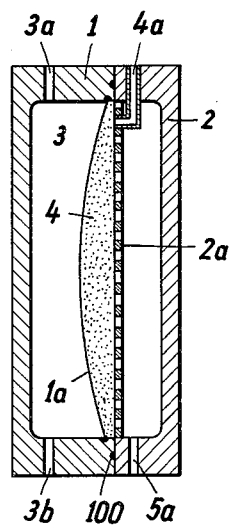
Figure 3:
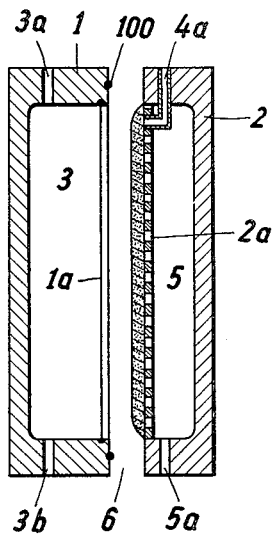

Referring now to the drawings in detail and FIGS. 1 to 3 thereof in particular, the filter press diagrammatically illustrated therein comprises primarily a diaphragm support 1 with a diaphragm 1a, a filter support 2 with a filter 2a and a pressure chamber 3 having an inlet 3a and outlet 3b for respectively admitting the pressure medium and discharging pressure medium, such as water. When the filter press is closed, the diaphragm 1a and the filter 2a confine therebetween the suspension and cake chamber 4 which is filled under pressure through the suspension inlet 4a. Even during this filling operation, a considerable quantity of liquid is separated from the material to be filtered which liquid passes through the filter 2a into the filtrate chamber 5 and is discharged through the filtrate outlet 5a. After the filtering operation has been completed, the suspension inlet 4a is closed and the pressure chamber 3 is placed under pressure by the introduction of water or another fluid medium under pressure through the inlet 3a. The diaphagm 1a will in this way press out a considerable further quantity of liquid contained in the suspension or cake chamber 4 and will thus compress the cake. After the post-pressing operation has been completed, a gap 6 (FIG. 3) is produced between the diaphragm support 1 and the filter support 2, the width of said gap being in excess of the thickness of the pressed cake. This gap may be produced by movement of the diaphragm support or by movement of the filter support. If the cake should not loosen itself from the filter 2a, it is merely necessary to produce a short compressed air shock in the filtrate chamber 5 in order to separate the cake from the filter and cause said cake to drop off.

While inlets 3a and 4a and the outlets 3b and 5a have been shown as open passages, it is, of course, understood that these passages have associated therewith valves for selectively opening and closing said passages. However, since such valves do not form a part of the present invention, they have been omitted in order not unnecessarily to complicate the drawings.

Figure 4:
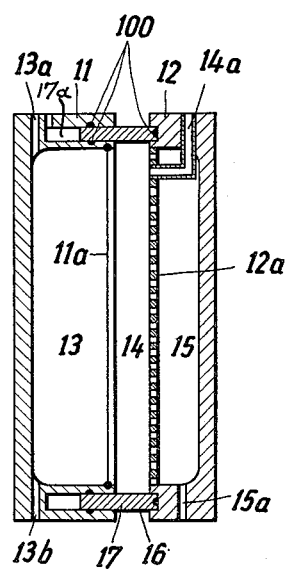
FIG. 4 is a diagrammatic section through a further embodiment of a diaphragm press according to the invention.

As will be evident from FIG. 4 illustrating a modification of the filter press according to the invention as described in connection with FIGS. 1 to 3, the diaphragm support 11 and the filter support 12 may also be arranged at a fixed distance with regard to each other, said distance being in excess of the thickness of the filter cake to be produced. The gap 16 between the diaphragm support 11 and the filter support 12 is in this instance bridged by an annular piston 17 which may be arranged in the filter support or, in conformity with FIG. 4 may be arranged in the diaphragm support and is adapted by means of a pressure medium to be advanced and retracted. When the annular piston 17 occupies its moved-out position, piston 17 encloses all around the suspension and cake chamber 14 located between the diaphragm 11a and the filter 12a so that a filling of the chamber 14 through the suspension inlet 14a may be accomplished, and the filtering may be effected. The post-pressing of the filter cake is effected by means of the diaphragm 11a by introducing a pressure medium through inlet 13a into the pressure chamber 13. After the post-pressing operation has been completed, the annular piston 17 is drawn back for instance by producing a low pressure in the cylinder chamber 17a, and the filter cake is, if necessary, loosened from filter 12a by a compressed air shock so that it can drop out through gap 16 which is then open since the piston 17 has been withdrawn out of said gap. It is, of course, to be understood that the retraction stroke of piston 17 must at least equal the desired width of the open gap, i.e. be in excess of the thickness of the filter cake.

Referring now to FIG. 5, this figure illustrates how a plurality of filter presses of the above mentioned type with stationary diaphragm support may be combined to a unit. The arrangement according to FIG. 5 comprises diaphragm supports 21 with diaphragms 21a, filter supports 22 with filters 22a, pressure chambers 23 with water inlets 23a and water outlets 23b and suspension and cake chambers 24 with suspension inlets 24a. The arrangement of FIG. 5 furthermore comprises filtrate chambers 25 with filtrate outlets 25a, and planes of separation 26 for the supports, guiding portions 28, partitions 29 and opening and closing means 30. For purposes of producing the gaps at 26 between the supports, the filter supports 22 are axially displaceable relative to the diaphragm supports 21 to which end they are guided in guiding portions 28 of the diaphragm support of the adjacent filter. The axial displacement of the filter support may be effected for instance by rotating rings 30 rotatably mounted on the guiding portions 28, said rings being provided with helical grooves engaged by pins carried by the filter supports, said pins extend through guiding slots 21a extending in axial direction and provided in the guiding portions 28. Each filter support 22 is provided with an intermediate wall or partition 28 separating the filtrate chamber 25 of one filter press unit from the pressure chamber 23 of the adjacent press unit.

According to the embodiment shown in FIG. 6, every two stationary diaphragm supports are combined to a unit. The arrangement of FIG. 6 comprises diaphragm supports 31 with diaphragms 31a, filter supports 32 with filters 32a, pressure chambers 33 with water inlets 33a and water outlets 33b, suspension and cake chambers 34 with suspension inlets 34a, filtrate chambers 35 with filtrate outlets 35a, gaps 36 in closed condition, stationary guiding portions 38, partitions 39, and opening and closing pressure chambers 80.

With the arrangement shown in FIG. 6, two members are always arranged stationarily, namely the diaphragm supports 31 combined in a unit and pertaining to two adjacent filter presses, and the guiding portions 38 in which the filter supports 32 of two adjacent filter presses are axially displaceably guided. Each two diaphragms confine a common pressure chamber 33. The rear walls 39 of two adjacent filtrate chambers 35 confine with each other a closure pressure chamber 80. By producing a pressure or vacuum in chamber 80, the filter supports 32 may be advanced and retracted thereby respectively opening the gap 36 or closing the same.

According to a further embodiment shown in FIG. 7, the filter supports are arranged stationarily. The arrangement according to FIG. 7 comprises diaphragm supports 41 with diaphragms 41a, filter supports 42 with filters 42a, pressure chambers 43 with water inlets 43a and water outlets 43b, suspension and cage chambers 44 with suspension inlets 44a, filtrate chambers 45 with filtrate outlets 45a, closed gaps 46, guiding portions 48, partitions 49 and opening and closing means 50.

The stationary filter supports 42 have that side thereof which faces the adjacent filter designed as guiding portion 48 for the diaphragm support 41 of the adjacent filter. The partitions 49 simultaneously serve as rear walls of the filtrate chambers 45 and of the pressure chambers 43. The opening and closing of the filter presses may be effected for instance hydraulically or pneumatically by pistons 50.

FIG. 8 illustrates an embodiment of the invention according to which every two stationary filter supports are combined to a unit. More specifically, the arrangement of FIG. 8 comprises diaphragm supports 51 with diaphragms 51a, filter supports 52 with filters 52a, pressure chambers 53 with water inlets 53a, and water outlets 53b, suspension and cake chambers 54 with suspension inlets 54a, filtrate chambers 55 with filtrate outlets 55a, closed gaps 56, annular pistons 57, and guiding portions 58.

As will be evident from FIG. 8, every two stationary filter supports 52 confine therebetween a common filtrate chamber 55, and every two diaphragm supports 51 are displaceably guided in axial direction in a stationary guiding portion 58 and confine between each other the common pressure chamber 53. The diaphragm supports are designed as annular pistons which are adapted to be reciprocated in corresponding annular chambers 57 of guiding portions 58 by means of a pressure medium whereby the filter presses may be closed and opened. With this arrangement, intermediate walls or partitions are not necessary.

While FIGS. 5 to 8 show parts only of a filter press, i.e. some units, FIG. 9 diagrammatically illustrates a complete filter press in which, similar to the arrangement of FIG. 8, the filter supports are arranged stationarily while, however, separate closure pressure chambers are provided. The arrangement of FIG. 9 comprises diaphragm supports 61 with diaphragms 61a, filter supports 62 with filters 62a, pressure chambers 63 with water inlets 63a and water outlets 63b, suspension and cake chambers 64 with suspension inlets 64a, filtrate chambers 65 with filtrate outlets 65a, gaps 66, annular pistons 67, guiding portions 68, partitions 69 and closing pressure chambers 90. The stationary filter supports 62 are again combined in pairs so that they enclose a filtrate chamber 65. The diaphragm supports 61 of two adjacent filter presses are respectively guided in a stationary annular guiding portion 68. In this connection one diaphragm support each may be provided with an inner cylindrical extension 61b which for purposes of improving the guiding effect may extend into the adjacent diaphragm support. The partitions 69 which separate the closure pressure chambers 90 from the pressure chambers 63 may be relatively thin because they are acted upon on both sides by pressure. The diaphragm supports arranged at the ends of the press are guided in the stationary end members E and likewise confine therewith closing pressure chambers. While the opening of the filter press may be effected alone by a low pressure in chambers 90, it is also possible to aid said low pressure by retraction springs 70 between each two adjacent partitions 69. If desired, the opening of the filter press may also be effected instead of by low pressure in chambers 90 by said retraction springs 70 alone.

The sealing of the various parts of the filter presses may be effected by sealing elements of any standard design well known in the art. These sealing elements have, therefore, been indicated merely schematically and have been designated with the reference numeral 100. For purposes of simplifying the manufacture of the press parts, their guiding and sealing, the individual structural elements, such as diaphragm supports, filter supports, annular pistons, guiding portions, etc., are preferably provided with circular cross section. The working rhythm of the filter press, such as closing, filling, filtering, pressing, opening and loosening of the cake, which are the same with all described embodiments, may be controlled manually, but preferably electrically, pneumatically or hydraulically.

The building up of the press of individual units as shown for instance in FIGS. 4 to 9 not only makes possible a large total filter surface and facilitates the containing of the high pressures employed in connection with presses of the type involved, but is also advantageous for the following reasons. Diaphragm and filter covering are according to experience the most sensitive structural elements of a diaphragm press. If damage occurs, such damage will generally be limited to one element, whereas the remaining elements remain undamaged. It is an important advantage if the replacement of a damaged element can be carried out so easily and rapidly that the loss in production will be kept low. Therefore, according to the present invention, the press units are equipped with bearing brackets which are detachably connected for instance by connecting bolts with the filter and/or diaphragm supports designed as a frame.

To each individual press unit, various supply pipes or supply lines have to be connected for instance for the admission of the dispersion, the discharge of the filtrate, the inlet and outlet of the pressure media for the pressing operation and, if desired, for the actuation of the annular pistons.

In order to facilitate the replacement of a damaged press element or press unit and to reduce the time and labor required therefor, it is suggested in conformity with the present invention that the supply lines communicating with the passage within the press units be connected to one or more of said bearing brackets and be either fixedly or detachably connected thereto.

More specifically, the individual press or filter units, of which one unit only is shown in FIGS. 10 and 11, are mounted upon the three tie-rods 101 and are held together by means of pressure-resistant end members and, for instance, nuts which are screwed onto the ends of the tie-rods 101. In the particular construction shown in FIGS. 10 and 11, each press or filter unit comprises a filter support 102 with the filter surface proper 103 and also comprises a diaphragm support 104 with the diaphragm 105. The diaphragm support 104 is designed as an annular piston and may be actuated hydraulically. When the annular chamber 107 is connected to the pressure medium supply line and the annular chamber 106 is relieved, the press will be opened. When the annular chamber 106 is under pressure and the annular chamber 107 is relieved, the press will close. When the annular piston 104 is moved outwardly, it presses the sealing ring 108 against the filter support 102 of the respective adjacent left-hand press unit.

The filter units are in conformity with the present invention equipped with three bearing brackets 109, 110 and 111 which are bolted to the filter support 102 designed as frame. With the bearing bracket 110, the connecting bolts 112 are shown in FIG. 1, whereas with the other bearing brackets they have been omitted in order not to impair the clarity of the drawings.

If a filter unit which is to be exchanged is by means of the ears 113 suspended on a lifting device as for instance a crane, and if the screws 112 are loosened on all three bearing brackets 109, 110, 111, the press unit may with moved-out diaphragm support or piston 104 be lowered downwardly without affecting other parts of the press. The bearing brackets 109 to 111 of the dismantled element remain undisturbed at their place so that also the installation of the replacement unit can be effected quickly and without great effort.

The supply lines are not directly connected to each filter unit but are connected to one or more of the bearing brackets 109 to 111. According to the embodiment shown in FIGS. 10 and 11, all supply lines are connected to the bearing bracket 111. The sealing of the passages through which the lines pass, and, more specifically, the seal of said passages toward the outside and relative to each other may be effected by insertion of a flat seal between the press unit and the bearing bracket 111, or by round chord seals or by O-rings which concentrically surround the individual passages and are embedded in grooves.

The connection 114 conveys the dispersion to be filtered into the press unit, whereas the connection 115 discharges the filtrate. The pressure medium for pressing out the filter cake is conveyed through connection 116 and is discharged through connection 117. The connections 118 and 119 serve for supplying the filter unit with hydraulic fluid for opening and closing the filter unit. This arrangement has the advantage that when exchanging a filter unit, no pipe connections have to be loosened and connected again so that the installation and removal will be effected without any material time loss.

The arrangement of the passages within the filter unit proper from the passages at the separating surface between filter unit and bracket 111 to the individual working chambers such as the filter chamber between diaphragm 105 and filter surface 103 when the unit is closed, filtrate collecting chamber 120, press chamber 121 and annular chambers 106 and 107 for hydraulically moving the diaphragm support or piston 104 do not form a part of the present invention.

Referring now to FIG. 12, this figure shows a side view of a diaphragm filter press composed of seven elements of which the filter supports 102 and bearing supports 109 and 111, and also the diaphragm supports 104 between the filter supports are visible. The individual elements are, together with the end pieces E resting on the supports 152, held together by nuts 151. The supply lines 114, 116 and 118, 119 and 115, 117 which in FIG. 11 have been shown as being located at the same level alongside each other are according to FIG. 12 (merely for the sake of clarity), shown as being located above each other. The arrangement furthermore comprises a control panel or control box S from which the press is to be controlled.

FIGS. 13a and 13b illustrate an embodiment for a control contained in said control box S. As will be seen from these figures, a centrifugal pump 121 feeds into the pressure container 122 the dispersion from which the water has to be withdrawn. Accordingly, the piston pump 125 feeds press water into the container 126, whereas the piston compressor 129 feeds compressed air for control purposes into the container 130. The arrangement furthermore comprises a gear pump 134 for feeding oil under pressure into the storage container 135. When the respective magnetic valves 124, 128 and 132 are energized, the pneumatic diaphragm valves 123, 127 and 131 open. When the magnetic valves are deenergized, the pressure chambers of the pneumatic valves 123, 127 and 131 communicate through conduits 124a, 128a and 132a with the free atmosphere, whereas when the said magnetic valves are energized, said pressure chambers communicate with the pressure container 130. When the magnetic valve 136 is energized, it establishes communication between the storage chamber 135 and the conduit 118 and permits the oil under pressure to return from conduit 119 through conduit 137 to a storage container (not shown in the drawing). When the magnetic valve 136 is in de-energized condition, the oil under pressure is conveyed from storage container 137 to conduit 119 while the flow back is effected from conduit 118 through conduit 137.

The electric control of the magnetic valves 124, 128, 132 and 136 is effected through the intervention of a program control apparatus. By closing the switch 138, the motor 139 pertaining thereto is connected to the network 144, 145. Through a non-illustrated reducing transmission, motor 139 will then drive a cam shaft 139a which latter will close and open contacts 140, 141, 142 and 143 in a desired sequence and for a desired period of time.

In the control diagram illustrated in FIG. 13b, I indicates the hydraulic closure step. During this phase, the magnetic valve 136 is energized through the intervention of switch 140 closed in conformity with the control characteristic 140a, and conveys the oil under pressure in such a way that the annular chamber 107 is placed under pressure while the annular chamber 106 is relieved. When filling the press with dispersion and at the subsequent pressure filtering according to phase II, the press remains closed, the dispersion inlet valve 123 is opened due to the energization of the magnetic valve 124 through the contact 143 closed in conformity with the control characteristic 143a, whereas valves 127 and 131 are closed.

During the pressing phase III, the magnetic valve 124 will be de-energized according to the characteristic 143a so that valve 123 will be closed, whereas valve 127 will be opened according to the control characteristic 142a in order to permit the inlet of press water. All other actuating members remain unchanged.

In phase IV, the valve 127 must be closed according to the control characteristic 142a, whereas valve 131 must open according to the control characteristic 141a in order to allow the discharge of press water through conduit 133.

The opening of the press is effected in phase V. All magnetic valves are de-energized in conformity with the control characteristics 140a, 141a, 142a, and 143a. The magnetic valve 136 switches the oil pressure from container 135 so that the annular chamber 106 will be under pressure, whereas the annular chamber 107 will be relieved through conduit 137.

It is, of course, to be understood that the present invention is, by no means, limited to the particular constructions shown in the drawings but also comprises any modifications within the scope of the appended claims. Thus, the supply of the suspension, the discharge of the filtrate, the supply and discharge of the press water and of the pressure fluid for opening and closing the filter presses may be effected not only in the manner illustrated in the drawings but also in any other suitable manner. Furthermore, the present invention is also applicable when the axis of the diaphragm filter press has to be arranged vertically, and when the discharging of the filter cake has to be effected by other means than its weight.

What I claim is:

1. In a diaphragm filter press for withdrawing liquid from a suspension containing material to be pressed into a cake: a filter support having a closed periphery, a filter supported by said filter support and confining therewith a filtrate chamber adapted to receive and discharge liquid filtered through said filter, a diaphragm support arranged opposite said filter support in spaced relationship thereto so as to leave a gap therebetween, a diaphragm supported by said diaphragm support and confining therewith a pressure chamber adapted to receive and discharge a pressure medium, and fluid-operable annular piston means reciprocably mounted in one of said supports and operable selectively sealingly to engage the other support to thereby confine with said filter and said diaphragm a chamber for receiving said suspension, said annular piston means also being operable selectively to withdraw out of said gap to thereby permit discharge of said pressed cake through said gap.

2. In a diaphragm filter press for withdrawing liquid from a suspension containing material to be pressed into a cake: a plurality of filter units arranged one behind the other and connected to each other; each of said filter units comprising a stationary diaphragm support having a closed periphery, a diaphragm supported by said diaphragm support and forming a part of a pressure chamber adapted to receive and discharge a pressure medium, a movable filter support also having a closed periphery, and a filter supported by said filter support and defining a part of a filtrate chamber adapted to receive and discharge liquid filtered through said filter; each of said diaphragm supports forming stationary guiding means for the filter support of the next unit adjacent the diaphragm support, each of said filter supports including a wall one side of which forms part of said filtrate chamber while the opposite side forms part of said pressure chamber of the next unit adjacent the filter support; and means engaging each of said filter supports and operable selectively to space the latter from the respective diaphragm support of said unit a distance in excess of the thickness of the cake to be pressed.

3. In a diaphragm filter press for withdrawing liquid from a suspension containing material to be pressed into a cake: a plurality of serially arranged filter units; each of said filter units comprising a stationary diaphragm support having a closed periphery, a diaphragm supported by said diaphragm support, a movable filter support also having a closed periphery, and a filter supported by said filter support and confining with said diaphragm when said supports engage each other, a chamber for receiving said suspension and said filter furthermore confining with said filter support a filtrate chamber for receiving the filtrate filtered through said filter; the arrangement being such that each two adjacent diaphragms are supported by one and the same stationary diaphragm support and confine therebetween a pressure chamber adapted to receive and discharge a pressure medium for actuating said diaphragm; stationary guiding means guidingly engaging each two oppositely movable adjacent filter supports which support each two adjacent filters; said guiding means together with the respective filter supports guidingly engaged thereby confining a pressure chamber for selectively moving said respective filter supports into engagement with the diaphragm supports of two successive units in response to the creation of a superatmospheric pressure between said respective filter supports; said movable filter supports also being selectively movable away from the last mentioned diaphragm supports in response to the creation of a sub-atmospheric pressure between said respective filter supports, said filter supports when moved away from said diaphragm being spaced therefrom by a distance in excess of the thickness of the cake to be pressed.

4. In a diaphragm filter press for withdrawing liquid from a suspension containing material to be pressed into a cake: a plurality of filter units arranged one behind the other and connected to each other, each of said filter units comprising a stationary filter support having a closed periphery, a filter supported by said filter support and confining therewith a filtrate chamber adapted to receive and discharge liquid filtered through said filter, a movable diaphragm support also having a closed periphery, and a diaphragm supported by said diaphragm support, said supports being inter-engageable whereby the supports and diaphragm and filter confine a chamber for receiving said suspension; each of said filter supports including annular guiding means, each of said diaphragm supports having means reciprocably guided in said guiding means of the filter support of an adjacent unit and confining therewith a pressure chamber for receiving a pressure medium for actuating said diaphragm; each of the diaphragm supports guided in the guiding means of the filter support of an adjacent unit being adapted in response to a sub-atmospheric pressure in the adjacent pressure chamber to move into a position where it is spaced from the next adjacent filter support a distance in excess of the thickness of the filter cake to be produced.

5. In a diaphragm filter press for withdrawing liquid from a suspension containing material to be pressed into a cake: a plurality of filter units arranged one behind the other and connected to each other; each of said filter units comprising a filter, a filter support supporting said filter, a diaphragm, a movable diaphragm support, and stationary guiding means for movably guiding said diaphragm support; the arrangement being such that each two adjacent filter supports are grouped together and together with the filters supported thereby confine a common filtrate chamber and that each two grouped together filter supports have connected therewith two diaphragm supports at opposite ends thereof when looking in axial direction of said filter supports; annular cylinder means respectively interposed between each two successive grouped together filter supports and having reciprocably mounted therein two diaphragm supports, one facing each filter support, said cylinder means being adapted selectively to be connected to a sub-atmospheric pressure source and to a super-atmospheric pressure source for respectively reciprocating the diaphragm supports therein away and toward said filter supports by a stroke in excess of the thickness of the filter cake to be pressed.

6. In a diaphragm filter press for withdrawing liquid from a suspension containing material to be pressed into a cake: a plurality of filter units arranged one behind the other and connected to each other; each of said filter units comprising a stationary filter support with a closed periphery, a filter supported by said filter support, a movable diaphragm support also having a closed periphery, and a diaphragm supported by said diaphragm support, said supports being inter-engageable whereby the supports and diaphragm and filter confine a chamber for receiving said suspension; each two filters of two adjacent filter units being carried by one and the same stationary filter support and confining therebetween a common filtrate chamber; and guiding means arranged between each two filter supports of successive units; each two diaphragm supports arranged adjacent to each other and supporting diaphragms of two successive filter units bing displaceably guided within one and the same guiding means; each diaphragm support including a wall confining with the adjacent diaphragm supported thereby a chamber adapted for receiving pressure fluid for actuating the diaphragm and each of said walls confining with the adjacent wall of the adjacent diaphragm support a pressure chamber adapted to receive and discharge a fluid medium for reciprocating the respective diaphragm supports for spacing the diaphragm supports from the respective filter supports to release filter cakes from therebetween.

7. In a diaphragm filter press for withdrawing liquid from a suspension containing material to be pressed into a cake, a peripheral wall formed by a plurality of abutting separable rim-like rigid support elements comprising, a filter support and a diaphragm support, a filter supported by said filter support adjacent said diaphragm support and defining with said filter support at least a portion of a filtrate chamber adapted to receive and discharge liquid filtered through said filter, an elastic diaphragm supported by said diaphragm support adjacent said filter support and defining with said diaphragm support at least a portion of a pressure chamber adapted to receive and discharge a pressure medium, said filter and said diaphragm defining therebetween when the supports are in abutting relationship, a chamber for receiving said suspension under pressure, thereby expanding said diaphragm to increase the size of said suspension chamber and exerting force of said diaphragm on the material in said suspension chamber, at least one of said separable elements being movable to open said suspension chamber for discharge of material remaining therein.

8. A diaphragm filter press composed of a plurality of filter units, each filter unit having a peripheral wall formed of a plurality of axially separable elements, two of said elements having opposed ends facing each other, a filter supported on and extending across adjacent said opposed end of one element, an elastic diaphragm supported on and extending across adjacent the said opposed end of the other element, said plurality of elements, said filter and said diaphragm forming a suspension chamber to receive a suspension for filtering by said filter, said chamber having an inlet to admit said suspension under pressure to expand said diaphragm to increase the volume of said chamber, said diaphragm when expanded exerting a pressure on material in said chamber, and said diaparhgm and its supporting element forming a pressure chamber for fluid under pressure to exert pressure on said diaphragm and material in said suspension chamber, and said filter and its said support providing a space for discharge of the filtrate after passage through said filter, the peripheral wall elements of said unit being axially separable to form a discharge passage for material in said suspension chamber.

9. The device claimed in claim 8 in which said two elements are relatively movable into engagement to close said suspension chamber and separable to form said discharge passage.

References Cited in the file of this patent
UNITED STATES PATENTS

| 387,594 | Kroog | Aug. 7, 1888 |
| 1,308,918 | Schwable | July 8, 1919 |
| 1,308,943 | French | July 8, 1919 |
| 2,849,121 | Burwell | Aug. 26, 1958 |

FOREIGN PATENTS

| 1,078,482 | France | May 12, 1954 |
| 1,107,651 | France | Aug. 10, 1955 |